Patented Oct. 30, 1945

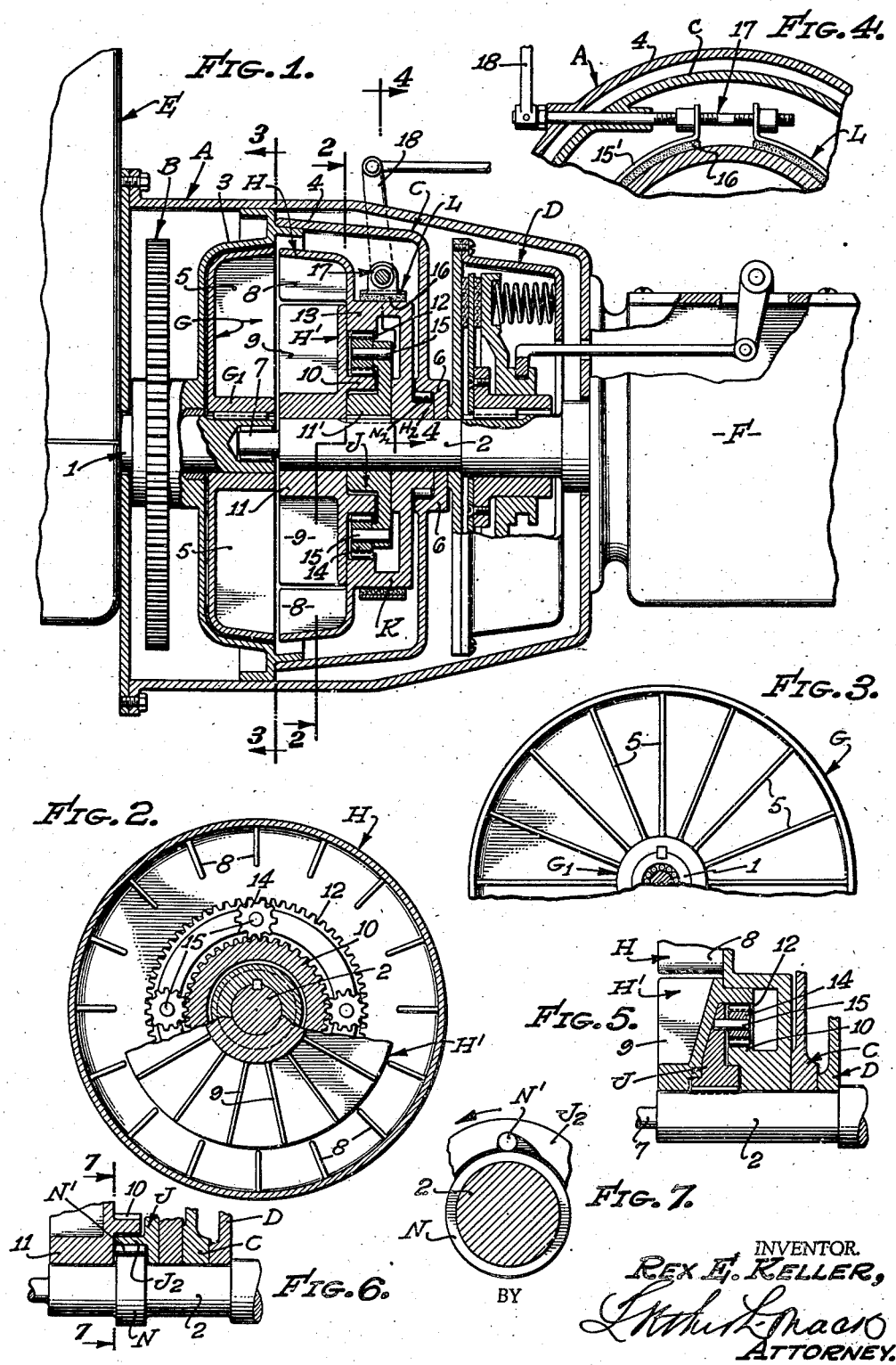

2,388,062

UNITED STATES PATENT OFFICE 2,388,062

MULTIPLE STAGE FLUID DRIVE TRANSMISSION

Rex E. Keller, Beverly Hills, Calif.

Application July 21, 1942, Serial No. 451,743

6 Claims. (Cl. 74—189.5)

This invention relates in general to fluid drive transmissions but more particularly to the provision of means embodied therein for imparting multiple stage driving characteristics.

It is well known that modern fluid drive transmissions include a stationary housing within which there is an impeller driven by a motor and a single runner connected with the driven shaft of the vehicle by means of which power is transmitted to the driven shaft through the medium of a fluid which is projected by the impeller against the vanes of the runner. Thus, power is applied from the motor to the propeller shaft of the vehicle in a degree proportionate to the speed of the motor.

My improvements are designed for application to a modern fluid driven transmission, but comprehend, broadly, the provision of two or more driving stages between the motor shaft and the propeller shaft by reason of the employment of at least two concentric and coaxially mounted runners in opposition to one or more impellers and with the vanes of the runners at least proportioned as to area so as to provide differential torque application to the propeller shaft of the vehicle to correspond to maximum and minimum power requirements. To such end I provide a differential gearing unit in the form of planetary or countershaft type gear reduction means, either with or without an overrunning clutch of free wheeling type, which is interposed between the runners in such a manner as to establish an automatically variable speed and power ratio between the drive shaft and the driven shaft of the transmission.

A preferred form of the invention may include as a differential unit a planetary gear train in which the sun gear is fixed for rotation with one of the runners, the ring gear of the train is fixed for rotation with the other runner, and the planet gear carrier is fixed to the driven shaft, the runner to which the sun gear is fixed being loose on the driven shaft. In another form the connections may be reversed with the inner runner fixed to the ring gear and the outer runner fixed to the sun gear.

Thus, on the starting of the vehicle in motion and at a moment of maximum torque and until a predetermined momentum has been established a maximum of power is transmitted to the driven shaft by one of the runners and the differential unit. When, however, the speed and power is increased to a point where a differential is no longer necessary and the two runners rotate together and with the unitary rotation of the differential unit a direct drive is established between the driving and driven shafts, as in other types of transmissions in which differential gearing is employed.

An object, also, is to provide means for retarding the rotation of one of the runners so that under certain conditions, as when it is descending a hill, the retarded runner would operate as a brake, thereby employing the motor compression to decrease the speed of the vehicle.

Other objects may appear as the description of my improvements progresses.

I have shown a preferred form of mechanism in the accompanying drawing, subject to modification, within the scope of the appended claims, without departing from the spirit of the invention.

In said drawings:

Fig. 1 is a sectional elevation of an assembled automotive transmission embodying my improvements;

Fig. 2 is a transverse section of the same on line 2—2 of Fig. 1;

Fig. 3 is a transverse section on line 3—3 of Fig. 1;

Fig. 4 is a fragmentary section on line 4—4 of Fig. 1.

Fig. 5 is a fragmentary section corresponding to Fig. 2 but showing a modified form of mechanism.

Fig. 6 is a view similar to the structure in Fig. 1 except that a free wheeling connection is shown between the differential and the driven shaft.

Fig. 7 is a section of the same on line 7—7 of Fig. 6.

Briefly described, a fluid driven transmission embodying my improvements includes: a conventional housing A which may serve to enclose a fly wheel B, a transmission case C and a clutch D, case C being fixed to housing A by suitable means not important to or a part of my invention. Fly wheel B usually has gear teeth on its periphery adapted to mesh with a starting pinion (not shown) and is fixed to the drive shaft 1 of a motor E while clutch D is operatively connected with a driven shaft 2 leading to a change speed gearing mechanism F.

The fluid driving casing C within housing A has separable members 3 and 4 suitably attached together so as to provide a seal against leakage of fluid from the case and at least one of said members is stationarily held by attachment to housing A or otherwise. Case member 3 encompasses drive shaft 1 and within the member 3, I provide an impeller G which has its hub G₁ fixed to drive shaft 1 and is provided with a plurality of radially disposed vanes 5.

Member 4 has a hub 6 which rotatably receives the driven shaft 2 and has at least a pair of coaxial and concentric runners H and H' rotatably mounted therein, for differential connection with the driven shaft 2. Shafts 1 and 2 are telescopically arranged, as at 7 for assuring alinement of said shafts as well as providing an inner bearing for shaft 2.

The outer runner has a plurality of radially disposed vanes 8 and the inner runner H' has a plurality of similarly or differently disposed vanes 9. The vanes on the runners are so arranged that the runners may operate without interference one with the other and yet so that the adjacent edges of the vanes thereon will be as close together as possible and practicable for preventing an undue loss of power due to the flow of fluid therebetween. The inner edges of vanes 8 and 9 are also closely spaced for a like reason relative to the adjacent edges of vanes 5 of impeller G.

In the form of mechanism shown therein I have employed a planetary type of transmission gears for differentially connecting the runners H and H' with the driven shaft 2 but it will be apparent to those skilled in the art that other types of gear trains may be used for a similar purpose and with good effect. As shown in Fig. 1, the inner runner H' has a sun gear 10 fixed to a side thereof or formed thereon while the outer runner H has an internal ring gear either fixed to or formed on a web 13 thereof, as at 12, in the plane of the sun gear 10. A plurality of planet gears 14 are carried on shafts 15 and are thereby supported on a carrier J, said planet gears serving to operatively connect the sun gear 10 with the ring gear 12. Runner H' has a hub 11 which is loose on shaft 2 and carrier J is splined or keyed at 11' to shaft 2. Thus the planetary gear train establishes a differential driving medium between the driving shaft 1 and the driven shaft 2, as in other types of planetary transmission units.

The outer runner H is provided with an external brake drum K around which is supported a contracting or expanding band L having a friction lining or shoe 16 and manually operable by means of a suitable cam or screw device 17 and a lever 18 whereby friction may be applied to the drum K for the purpose of retarding the rotation of runner H relative to the runner H'. The brake actuating means is so arranged that no leakage from the interior of case C may occur at any time which would occasion an impairment of the fluid driving mechanism. The particular means employed for actuating the brake is not a part of my invention and it is quite apparent that any one of many types of expanding or contracting devices may be employed for the purpose of either expanding or contracting the band L.

The clutch D, as well as the connection of the driven shaft 2 therewith, are interposed between the shaft 2 and the main shaft of the gear reducing unit F and do not constitute elements of my invention, hence, it is not deemed necessary to describe such units and details.

In Fig. 5 I have shown a modified form of mechanism in which the sun gear 10 is formed on or affixed to the outer runner H and the ring gear 12 is carried on the inner runner H' with the planet gear carrier J interposed between the runners about the axis of shaft 2. It will be quite apparent that the particular runner to which the greatest power is applied may overrun the other runner, and yet when the distribution of power to the two runners is equalized, or when the direct driving runner receives sufficient power from the impeller, the two runners will rotate together synchronously.

In operation, when the motor is initially connected with the transmission unit and is operating at an initial speed the rotation of the impeller serves to effect the rotation of which ever runner H or H' is connected for receiving the initial power impulses, thereby communicating to the driven shaft 2 the effort generated by the impeller for rotating shaft 2 at a speed substantially below the then possible speed effective through a direct driving connection and in such case applying a maximum torque to shaft 2.

As the speed of the impeller is accelerated and momentum of the vehicle is increased the direct driving runner will overtake the initial driving runner and the two runners will then rotate synchronously for as long a time as such conditions prevail.

Thus, when one of the runners or the carrier J is fixed to shaft 2, or when the other runner or both runners are differentially rotatable while the carrier is fixed to or free wheelingly connected with shaft 2, the power applied to shaft 2, whether directly or through the differential gearing, will depend upon the area of the vanes on the two runners, the radial distance of said vanes from their common axis and the ratio of the gears of the differential unit.

Hence, the arrangement of the elements of my mechanism herein shown and described is effective for automatically changing the power ratio between the driving and driven shafts. When a free wheeling clutch is employed in lieu of a positive driving connection the runner receiving the initial impulse will drive shaft 2 at a low gear ratio until it is overrun by the other runner, whereupon the two runners will rotate synchronously and any tendency of the faster operating runner to reduce its speed will be compensated for by the direct driving runner.

I have shown in Fig. 6 the adaptation of the free wheeling clutch interposed between the differential gear and the driven shaft. Such clutch includes a core member N fixed to shaft 2, a set of free wheeling rollers N' and a drum J2, the rollers N' being as usual confined in notches either in the core N or the drum J2. Thus, in lieu of the key as shown at 11' in Fig. 1 for connecting the pinion carrier with shaft 2, a free wheeling clutch is provided so that one of the clutch connecting elements may over-run the other.

I may provide, as shown in Fig. 1, a free wheeling clutch between the outer runner H and the stationary case C, or between said case and whichever of the runners H or H' is fixed for rotation with the ring gear 12, so as to prevent the rotation of the thus connected runner in a direction opposite to that of shaft 2 and the other runner. Thus, the free wheeling clutch of Fig. 1, would be reversibly operative with respect to the clutch shown in Figs. 6 and 7, and the ring gear and the runner connected therewith could only operate in a forward direction. Said clutch includes rollers N2 arranged (as in Fig. 7) between hub H2 of runner H and hub 6 of case C.

What I claim is:

1. A fluid drive transmission comprising: a fluid coupling unit including a housing arranged to contain a fluid transmission medium, a driving shaft and a driven shaft coaxially mounted therein, an impeller rotatably mounted in the housing and fixed to the drive shaft, a pair of rotatable runners in the housing loosely carried by the driven shaft, and a planetary transmission unit also in the housing and including a sun gear carried by one of the runners, an orbit gear carried by the other runner, a member intermediate portions of the runners and fixed to the driven shaft, and pinions operably supported on said member and engaging said sun and orbit gears, said runners having vanes disposed in a common transverse plane and arranged with the vanes on the outermost runner completely overlying and encompassing the vanes on the innermost runner, for differentially applying power to the driven shaft in accordance with variations in the speed of the drive shaft.

2. A fluid drive transmission as characterized in claim 1 including: a free wheeling unit within the housing and operatively connected between one of the runners and a fixed part of the housing.

3. A fluid drive transmission as characterized in claim 1 including: a brake drum within the housing and associated with the outermost runner, a brake band around said drum, and means positioned internally of the housing connected with said band and projecting externally of the housing, to be operable for retarding the operation of the outermost runner.

4. A fluid drive transmission as characterized in claim 1 including a free wheeling unit in the housing operatively connecting the outermost runner with the housing, and a brake in the housing associated with the outermost runner.

5. A fluid drive transmission as characterized in claim 1 including: a case for commonly enclosing the fluid transmission unit, the planetary gear unit, the free wheeling unit and the brake, and means including a part extended through the housing and adapted for connection externally of the housing with a brake operating means.

6. A fluid drive transmission comprising: a fluid coupling unit including a housing arranged to contain a fluid transmission medium, a driving shaft and a driven shaft coaxially mounted therein, an impeller rotatably mounted in the housing and fixed to the drive shaft, a pair of rotatable runners in the housing loosely carried by the driven shaft, and a planetary transmission unit also in the housing and including a sun gear carried by one of the runners, an orbit gear carried by the other runner, said runners having vanes disposed in a common transverse plane, the vane on the outermost runner being smaller than the vane nearer the center.

REX E. KELLER.